United States Patent [19]

Pupillo et al.

[11] Patent Number: 4,779,841
[45] Date of Patent: Oct. 25, 1988

[54] ASSEMBLY AND METHOD FOR INSTALLING AND RETAINING VALVE SEALS

[75] Inventors: Andrew Pupillo; Jon A. Babcock, both of Westerly, R.I.

[73] Assignee: Posi-Seal International, Inc., North Stonington, Conn.

[21] Appl. No.: 883,699

[22] Filed: Jul. 9, 1986

[51] Int. Cl.⁴ .............................................. F16K 7/22
[52] U.S. Cl. ..................... 251/306; 251/316
[58] Field of Search ............. 251/306, 307, 316, 317, 251/360; 137/315

[56] References Cited

U.S. PATENT DOCUMENTS

| | | |
|---|---|---|
| 3,105,672 | 10/1963 | Kinney et al. ........................ 251/306 |
| 3,642,248 | 2/1972 | Benware . |
| 3,986,699 | 10/1976 | Wucik, Jr. et al. . |
| 4,006,883 | 2/1977 | Hulsheimer ......................... 251/307 |
| 4,113,268 | 9/1978 | Simmons et al. . |
| 4,220,314 | 9/1980 | Lynch ................................. 251/307 |
| 4,398,695 | 8/1983 | Trobe ................................. 251/306 |

Primary Examiner—A. Michael Chambers
Assistant Examiner—John C. Fox
Attorney, Agent, or Firm—Morgan & Finnegan

[57] ABSTRACT

An assembly for retaining a seal ring in a seating surface of a valve is provided having a circumferential groove disposed in the seating surface for receiving the seal ring. The groove has a pair of substantially opposed side walls, one of which includes a first retention member extending into the groove. The opposite side wall is provided with a circumferential slot which is accessible from outside the valve sealing surface through a passage. A second circumferential retention member is inserted into the slot throughout the passage and protrudes into the groove such that both retention members cooperate to retain the seal ring within the seating surface.

5 Claims, 4 Drawing Sheets

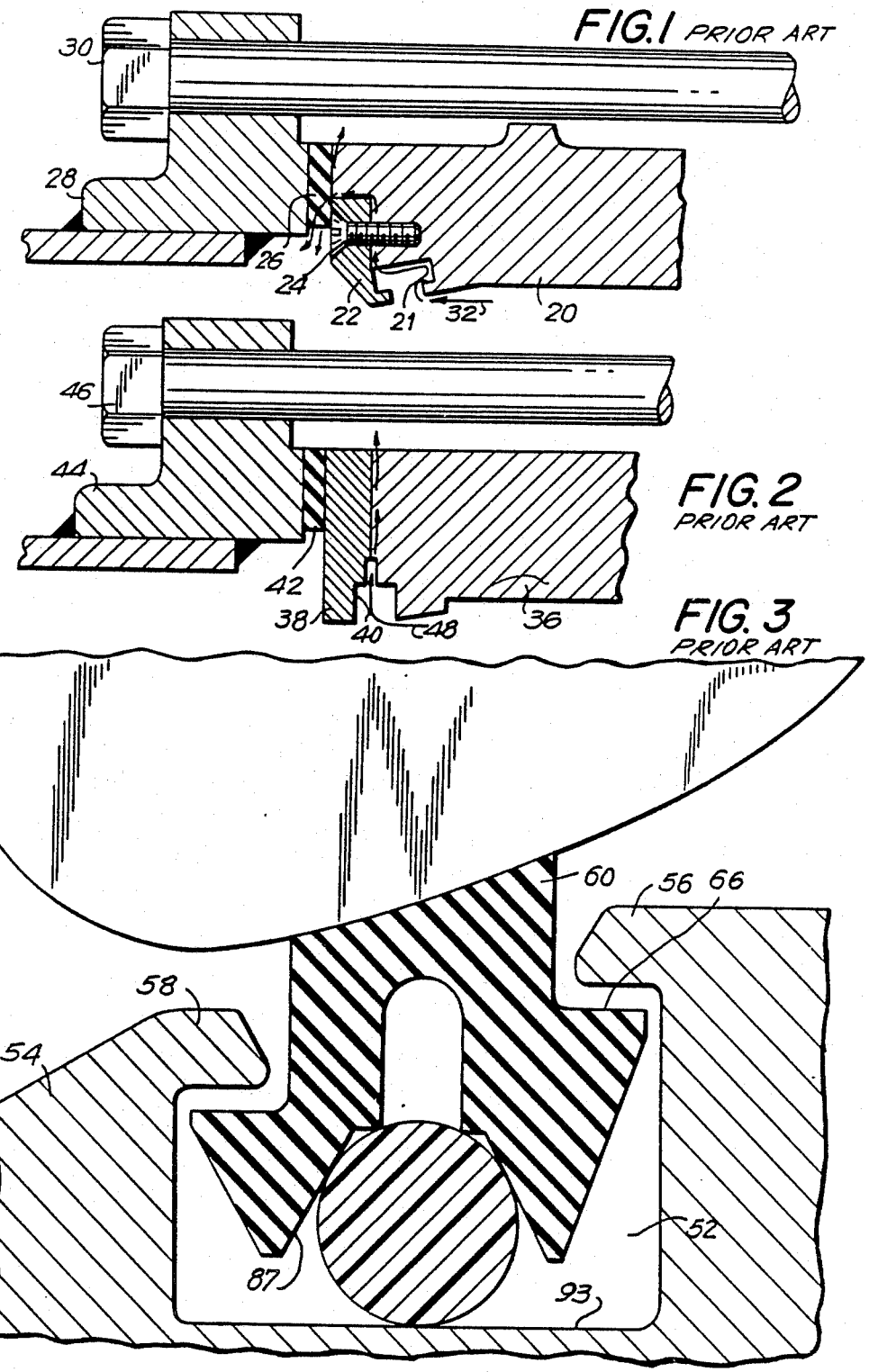

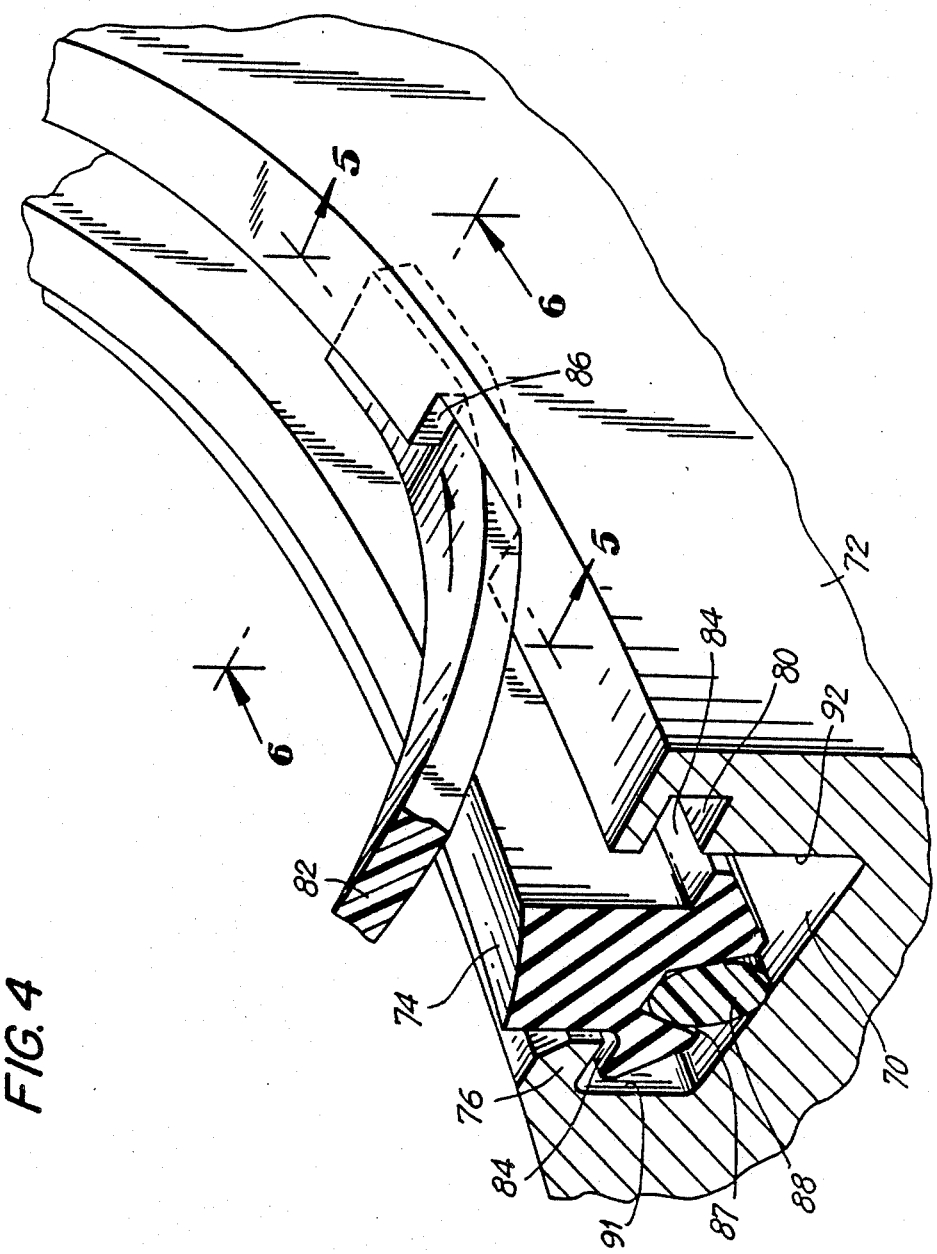

ASSEMBLY AND METHOD FOR INSTALLING AND RETAINING VALVE SEALS

FIELD OF THE INVENTION

The present invention relates to sealing mechanisms and more particularly to improved seal ring retention assemblies and methods which permit easy installation and replacement of seal rings.

BACKGROUND OF THE INVENTION

The sealing of adjacent valve surfaces against fluid flow is commonly accomplished by means of a seal ring disposed within a groove or channel formed in one of the valve surfaces. Valves generally have some form of retention assemblies for retaining the seal in the sealing surface. Such retention assemblies, however, not only increase the cost of the valve but, under certain operating conditions, can actually compromise the valve's performance. This is especially true for valves which are required to withstand extreme conditions of temperature and pressure such as, for example, in High Performance Butterfly Valves (HPBV). The subsequent discussion is directed to specific applications in HPBV as being exemplary of other valves in the art and is not intended to be a limitation on the application of the invention.

Various designs have been used for retaining the seal members within a groove in a sealing surface of the valve even under adverse operating conditions. An example is shown in U.S. Pat. No. 3,642,248, issued to Robert E. Benware and owned by the assignee of the present invention. Benware discloses a valve sealing mechanism wherein a seal ring is confined in an undercut circumferential groove. These seal rings are usually composed of a resilient material having the ability to deform and reform to their original shape. They are provided with a pair of longitudinal shoulders which are engagable with opposing flanges formed in the circumferential groove.

An optional backing ring may be used to force the shoulders of the seal ring to abut the flanges formed in the groove. This backing ring serves the dual function of urging the seal ring out of the groove into firm contact with the sealing surface and of sealing against leakage of fluid under pressure behind the seal ring.

Installation of seal rings within a groove has heretofore been accomplished in different ways. For example, installation can be accomplished by temporarily deforming the seal ring and inserting it between the retaining flanges and into the groove. Once in place, it reforms and is retained in the groove by the retaining flanges abutting or aligning with the longitudinal shoulders of the seal ring.

It will be understood, however, that if the seal ring is designed so that it can be readily inserted into the groove, then it is possible for it to be pulled out when the seal ring is placed under severe operating conditions by high velocity fluids. This possibility of extraction is caused by a low pressure region created as the fluid flows past the seal ring at high velocity. The low pressure region creates a vacuum over the seal ring and acts to draw it into the flow stream. Theoretically it might be possible to design a seal ring so that it seats into a groove sufficiently tight to prevent it being drawn out by the low pressure region. However, this would require special equipment to install the rings and there is an increased risk of damage to the ring during installation.

Valves also have been provided with separate seal retaining ring assemblies which either cover the full raised face of the valve or are the screwed-on type which partially cover the valve face. These assemblies generally permit much closer clearances between the retaining rings and the seal rings and, further, permit the use of non-deformable seal rings of various compositions. They do, however, possess the disadvantage of having an inherent leak path created by the separate retaining ring.

In the case where a separate full face cover is provided, the leak path to the outside of the valve is formed at the interface between the retaining flange and the sealing face of the valve housing. To block this leak path, separate gasket materials can be incorporated between the retaining ring and the valve body. In the screwed-on type retaining ring assembly, the creation of the leak path is further compounded by the attachment screws which interrupt the sealing face of the valve. This interruption increases the possibility of flange gasket failure.

Where a separate retaining ring assembly is used, installation and/or replacement of seal rings is complicated. The retaining ring and gasket seal must be removed, usually necessitating complete removal and disassembly of the valve.

In each of the methods discussed above, particular consideration must be given when the valve is used under dead-end service conditions. These conditions occur when a valve is placed under pressure on one side of the sealing surface while the piping is removed from the opposite side. Where this occurs, the retainer assembly is exposed and must support a portion of the extreme pressure exerted on the valve sealing surface.

OBJECTS AND STATEMENT OF THE INVENTION

It is therefore an object of the present invention to provide an improved seal retention assembly which permits an uninterrupted gasket face on the valve without creating an additional leak path.

It is another object of the present invention to provide an improved seal retention assembly which does not require a removable retainer or its fasteners to support loads in dead-end service valves.

It is a further object of the present invention to provide an improved seal retention assembly which securely retains the seal ring and can be installed and/or removed without the need for special equipment or disassembly of the valve.

It is another object of the present invention to provide a method for easily and efficiently installing and/or removing a valve seal utilizing the present improved seal retention assembly.

These objects and others are accomplished by the present invention and particular embodiments of this invention are described herein below.

In one advantageous embodiment employing the present invention, a first member which is to be sealed with respect to a second member is provided with a circumferential groove which is shaped so as to cooperate with a slidable retaining member to maintain a seal ring in operable position.

The seal ring used with the present invention can be of any appropriate shape or material necessary for the desired application. Exemplary seal rings are those having a body formed with longitudinal shoulder portions as described in U.S. Pat. No. 3,642,248.

In applications wherein tight sealing is not required, the seal ring may be in the form of a split ring or even formed in a plurality of segments for installation in the groove. This is particularly advantageous where the seal is best formed of a brittle material such as graphite which would not be insertable in one continuous piece.

The groove is provided with an undercut side wall so as to provide an overhanging portion forming a first retaining flange or lip. This first retaining flange is engagable with one shoulder of the seal ring. An annular slot is formed in the side wall opposite the first retaining flange. The annular slot is accessible from either inside the flow chamber of the valve or outside the valve housing as desired through a passage formed in the housing. That passage is dimensioned to permit a retention member to be inserted through the passage and into the annular slot. Once the seal ring is properly seated into the groove, this retention member is inserted through the passage to fill the annular slot. The retention member is held in the annular slot and extends into the circumferential groove to form a second retention flange for engaging the seal ring to insure secure and efficient retention of the seal ring within the groove. This effectively prevents the low pressure region created by the passage of fluid at high velocity discussed above from drawing out the seal ring into the fluid flow.

Utilizing this method and assembly, a wide variety of materials may be utilized in forming the seal ring. There is no requirement that the materials be capable of deforming to pass between and fit within the confines of a pair of restricted retention flanges. It is only necessary that the seal be capable of passing through a smaller diameter opening to reach the cavity. This can be accomplished by segmenting the seal ring or by splitting the seal ring to permit insertion. Alternatively, the seal ring can be formed of a material sufficiently deformable to pass, in one piece, through the smaller diameter opening to reach the cavity. Also, by utilizing the present invention, the seal ring can be easily removed and replaced without requiring complete disassembly of the valve.

The foregoing and other objects, features and advantages of the present invention will become apparent from the description of preferred embodiments in connection with the accompanying drawings.

BRIEF DESCRIPTION OF THE DRAWINGS

FIG. 1 is a side elevational view, in cross-section, of a PRIOR ART screw-type sealing flange assembly for High Performance Butterfly Valves;

FIG. 2 is a side elevational view, in cross-section, of a PRIOR ART solid sealing flange assembly for High Performance Butterfly Valves;

FIG. 3 is a side elevational view, in cross-section, of a PRIOR ART groove and wear ring assembly in accordance with the Benware patent.

FIG. 4 is a perspective view, in section, of one embodiment of the retention strip of the present invention;

DETAILED DESCRIPTION OF PREFERRED EMBODIMENTS

Figure 5:
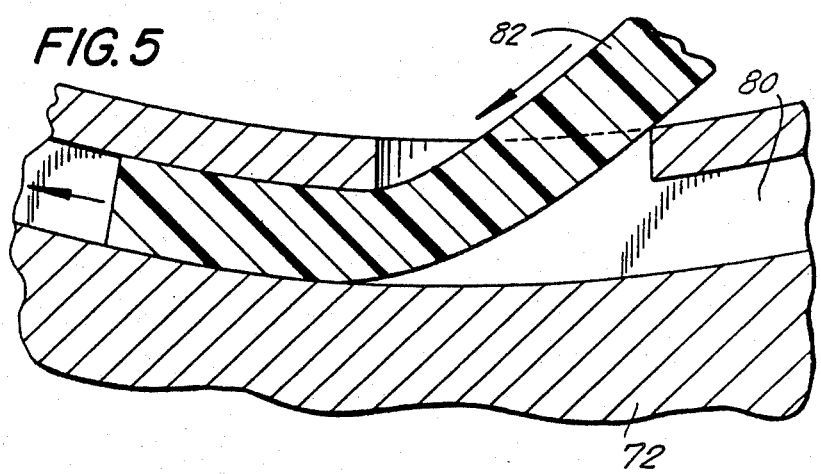
FIG. 5 is a sectional side elevational view, in cross-section taken along line 5—5 of FIG. 3, of the retention strip of one embodiment of the present invention.

Referring now to the drawings and, in particular, to FIGS. 1—3, there are depicted three (3) embodiments of PRIOR ART sealing and seal ring retention assemblies. Though these PRIOR ART devices are shown in their application to High Performance Butterfly Valves (HPBV), for the purposes of the present invention their design and usage is similar in other applications.

FIG. 1 shows a typical "screwed-on" type flange sealing apparatus in accordance with the PRIOR ART. The valve body 20 has a portion of a circumferential groove 21 formed or cut therein for placement of a seal ring (not shown). This seal ring is held within the groove 21 by a separate circumferential sealing flange 22 which is maintained in abutment with valve body 20 by means of a plurality of retaining screws 24. After the seal ring, sealing flange 22 and retaining screws 24 are in position, a second annular resilient seal 26 is interposed between valve body 20 and circular retaining block or pipe flange 28. This second seal 26 is held in place by means of a circular retaining block 28, which block is placed in compression by a plurality of bolts 30.

As shown in FIG. 1, the use of this assembly forms a potential leak path as indicated at arrow 32 for high pressure fluid to escape the sealing assembly and vent to the outside of the valve body or into the downstream side of the valve. The sealing assembly further includes a plurality of interruptions formed in sealing flange 22 by the placement of retaining screws 24.

The sealing assembly of FIG. 2, shown generally at 38, demonstrates another example of the PRIOR ART. A valve body 36 is placed in abutment with circumferential flange 38, which together form the circumferential groove 40 for the seal ring (not shown). An annular seal 42 is interposed between a retaining block or pipe flange 44 and sealing flange 38 in order to maintain the close clearances between said flange and valve body to prevent fluid leakage. The resilient seal 42 is maintained in compression by tightening bolt 46 to the desired specifications.

This configuration, while eliminating the interruption in the sealing flange created by the retaining screws in the assembly of FIG. 1, does not eliminate the potential leak path (shown by arrow 48) which is inherently formed at the interface between sealing flange 38 and valve body 36. These potential leak paths can exist in both of the PRIOR ART embodiments utilizing the sealing assemblies shown in FIGS. 1 and 2.

FIG. 3 shows another PRIOR ART embodiment which incorporates a separate circumferential sealing assembly disposed in the valve body 54. This assembly comprises an undercut, circumferential groove 52 having two overhanging flange members (56 and 58) which are intended to maintain seal ring 60 within the groove 52. This arrangement, however, requires a seal ring capable of being substantially deformed so as to permit insertion within groove 52 and yet rigid enough to prevent seal ring 60 from being extracted from groove 52 when placed in operation under conditions of high velocity fluid.

Referring now to FIG. 4 an embodiment of the present invention is shown. Valve housing 72 includes a circumferential groove 70 for receiving a seal ring 74.

This groove 70 (best show in FIG. 6) includes a pair of substantially opposed side walls 91 and 92. Side wall 91 is undercut so as to provide an overhanging flange portion 76. Flange portion 76 is positioned so as to be engagable with a circumferential longitudinal shoulder 78 formed in seal ring 74. An annular slot 80 is provided in the groove side wall 92 opposite overhanging flange portion 76. This slot 80 is dimensioned to maintain a retaining strip or member 82. In its proper position in slot 80, retaining strip 82 extends into groove 70 for engaging a circumferential longitudinal shoulder 84 formed in seal ring 74. The retaining strip is preferably flexible and can be made from any appropriate material including but not limited to Teflon (a trademark of E.I. DuPont DeNemours & Co. for a polymer of tetrafluoroethylene), Tefzel, (a trademark of E.I. DuPont DeNemours & Co. for synthetic resinous Fluorine-containing polymers), nylon, stainless steel or any of the nickel based alloys such as the Inconels (a trademark of International Nickel Company, Inc. for nickel alloys and alloys of nickel, chromium and iron).

Figure 7:
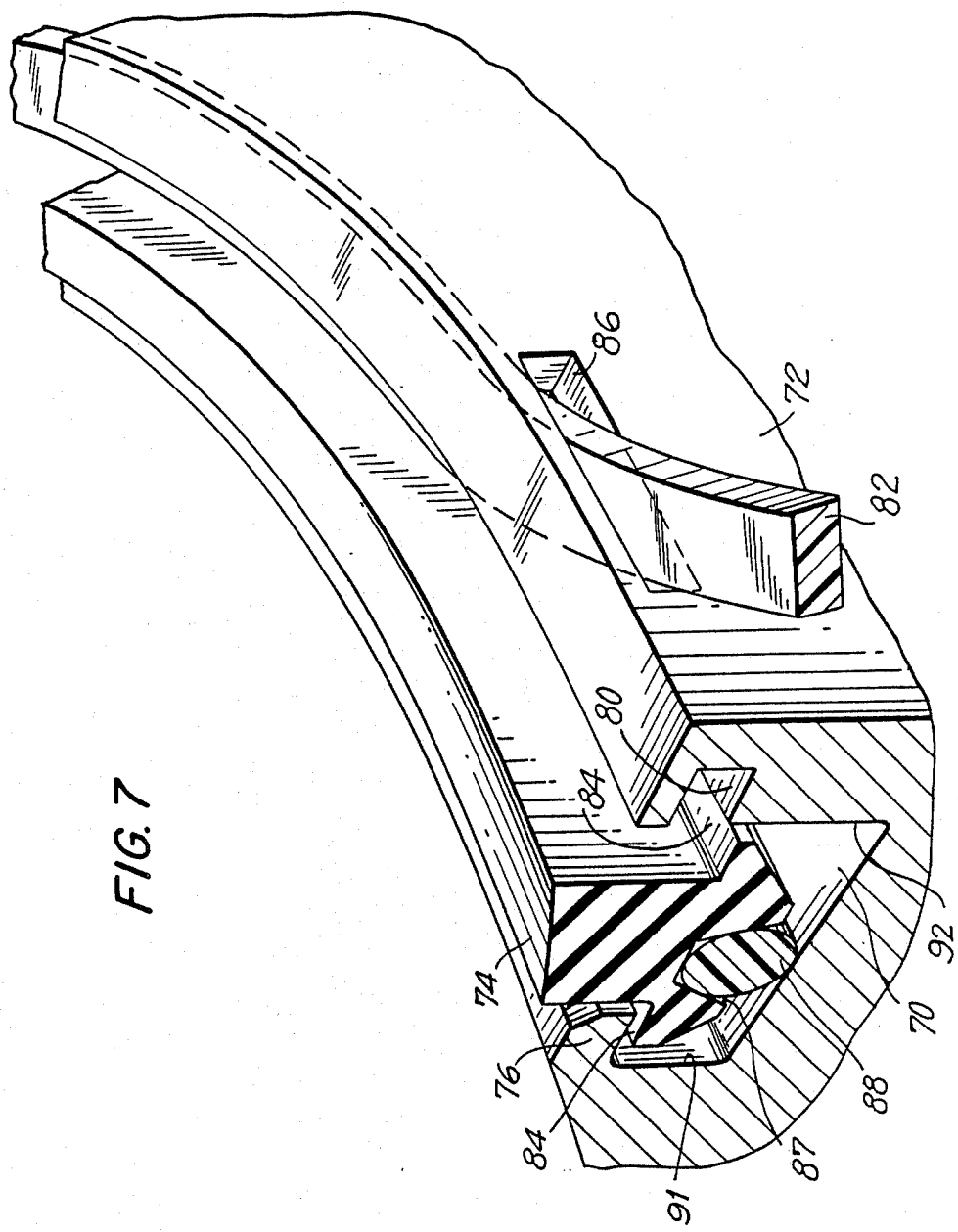
FIG. 7 is a perspective view, in section, of another embodiment of the retention strip of the present invention.

Access to slot 80 is provided by a passage 86 formed in valve body 72. This passage 86 permits the insertion of retaining strip 82 from inside the flow chamber of the valve after seal ring 74 has been positioned within groove 70. The passage 86 may, alternatively be formed from outside the value body 72 depending upon the desired application, shown in FIG. 7. Passage 86 also permits easy removal of retaining strip 82, for example by means of a standard needle nose pliers.

Seal ring 74 may be provided with a circumferential channel 87 formed in its rear surface to receive a backing ring 88 which is in contact with the floor 93 of circumferential groove 70. This backing ring 88 provides a supplementary sealing surface between the seal ring 74 and the base 93 of the circumferential groove 70. It also serves to bias seal ring 74 away from the circumferential groove and maintain seal ring 74 in closer proximity to or against retaining flange 76 and the retaining surface with the valve disc 94.

Figure 6:
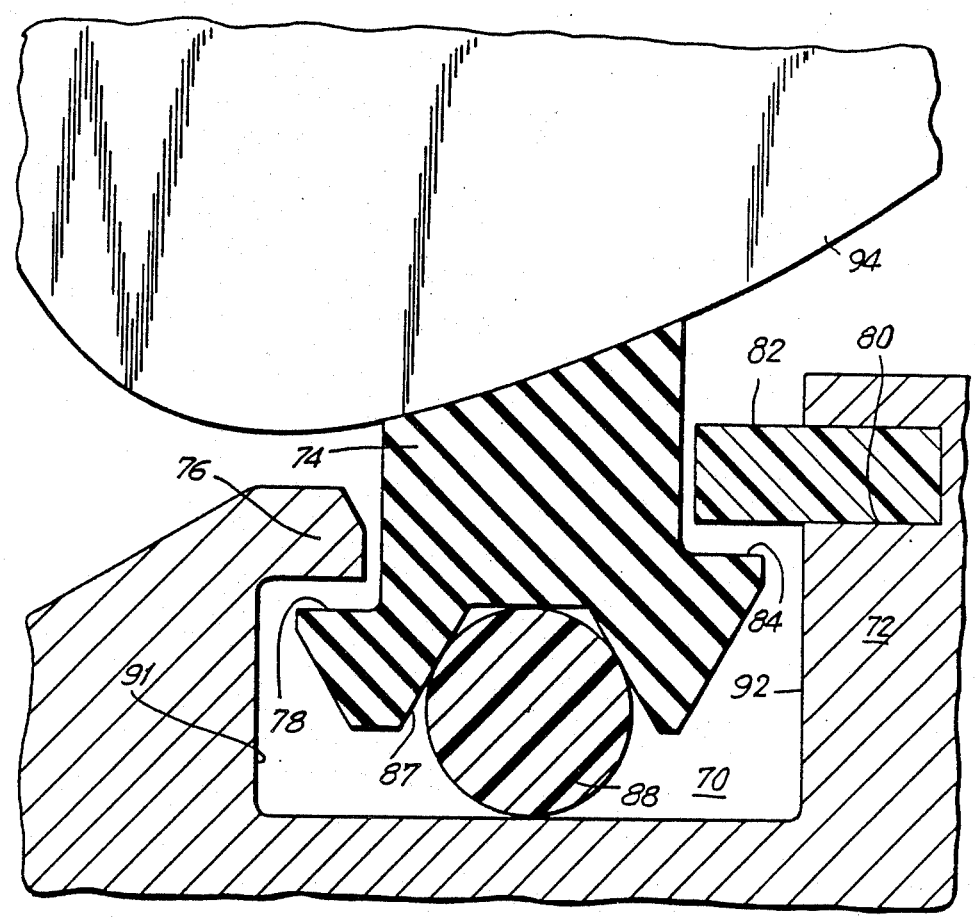
FIG. 6 is a side elevational view, in cross-section taken along line 6—6 of FIG. 4, of the retention strip, wear ring, and backing ring in operable position.

A particularly advantageous method for installing and retaining a seal ring in accordance with the present invention involves first inserting a seal ring or a seal ring/backing ring combination into the groove as shown in FIG. 6. The ring 74 should be positioned such that overhanging flange portion 76 overlies longitudinal shoulder 78. Once the seal ring is properly positioned, a retaining strip (shown in FIGS. 4 and 5) is slidably inserted into passage 86 and fed around the circumference until the slot 80 is sufficiently filled to retain seal ring 74 within groove 70 by blocking shoulder 84. The retaining strip need not fill the entire circumferential length of slot 80 and may alternatively be segmented as desired. This retaining strip 82 may advantageously be formed in predetermined lengths corresponding to the circumference of slot 80 or may be provided in longer lengths which are subsequently cut to size. The retaining strip can also be formed from any appropriate material capable of deforming sufficiently for insertion through passage 86 into slot 80. The arrangement of the invention provides several advantages over the prior art devices. For example, the seal ring need no longer be formed of resilient material capable of deforming for insertion within a constricted slot formed in the valve body. This permits the use of a wide range of materials tailored to a particular application. For example, where absolute leak-proof sealing is not required, as in certain control valves, the seal ring can be formed in sections of non-deformable materials as described above. Alternatively, the seal ring may be in the form of a split circumferential ring which can be minimally deformed to pass through the smaller diameter opening to reach the groove 70.

Depending upon the particular application or need, a wide range of tolerances may be used between the seal ring and the circumferential groove without requiring special equipment to install or remove the ring and without the resultant potential for damage to the ring during installation. A further advantage of the present invention is that it permits easy installation and removal of seal rings in the field without disassembling other valve components or requiring complete removal of the installed valve. This is easily accomplished by withdrawing one end of the retaining strip from its position in the passage to the annular slot, lifting out the seal ring and inserting a replacement. Once the replacement is in position, the retaining strip is reinserted through the access passage and the sealing assembly is ready for operation.

The foregoing is considered as illustrative only of the principles of the present invention and is not limited to the particular embodiments discussed herein. Various changes, substitutions and modifications may be made thereto by those skilled in the art without departing from the spirit or scope of the invention defined by the appended claims.

What is claimed is:

1. A method for retaining a shouldered seal ring in a seating surface of a valve comprising the steps of:
   providing a circumferential groove in the valve seating surface, said groove having a pair of substantially opposed side walls and a base portion, one of the groove side walls having a first retention flange member extending into the groove, the other groove side wall having a slot;
   providing a passage from outside said valve body to said slot;
   inserting the seal ring into said groove, said first retention flange member overlying a shoulder portion of said seal ring; and
   inserting the second retention flange member through said passage and into said slot to overlie a second shoulder portion of said seal ring.

2. A method as in claim 1 wherein said method comprises the further step of inserting a backing ring into the base portion of said groove before inserting said seal ring, said backing ring adapted for urging the shoulder portions of said seal ring toward the first and second retention flange members.

3. An assembly for retaining a seal ring in a seating surface of a valve comprising: a circumferential groove disposed in the seating surface for receiving the seal ring, the groove having a pair of substantially opposed side wall, one of said side walls including a first circumferential retention member extending into the groove, the other side wall including a circumferential slot, said seating surface including a passage accessing said slot extending from outside the valve seating surface; and a second circumferential retention flange member insertable through said passage and receivable in said slot with a portion of said second flange member extending into the groove such that said first and second flange members can engage the seal ring to retain it within the seating surface.

4. An assembly as in claim 3 wherein said passage accessing said slot extends from the flow chamber of said valve to said slot.

5. An assembly as in claim 4 wherein said sealing ring is formed in a plurality of sections.

* * * * *